United States Patent

Martinson et al.

Patent Number: 5,859,857
Date of Patent: Jan. 12, 1999

[54] METHOD FOR THE INTEGRATION OF ADDITIONAL DATA IN DIGITAL DATA PACKETS

[75] Inventors: Thomas Martinson; Fabrice Bonvin, both of Freiburg; Rainer Fehr, Hofstetten, all of Switzerland

[73] Assignee: Ascom Tech AG, Gesellschaft Für Industrielle Forschung + Technologien der Ascom, Bern, Switzerland

[21] Appl. No.: 678,078

[22] Filed: Jul. 10, 1996

[30] Foreign Application Priority Data

Jul. 24, 1995 [CH] Switzerland ............... 2162/95

[51] Int. Cl.⁶ ............... H03M 13/00; H04J 3/00; H04J 3/12
[52] U.S. Cl. ............... 371/37.01; 370/522; 370/529
[58] Field of Search ............... 371/37.01, 37.02; 370/522, 529

[56] References Cited

U.S. PATENT DOCUMENTS

| | | | |
|---|---|---|---|
| 4,242,750 | 12/1980 | Finck et al. | 371/20.5 |
| 4,284,843 | 8/1981 | White | 178/69 G |
| 4,408,325 | 10/1983 | Grover | 370/522 |
| 4,644,537 | 2/1987 | Gitlin et al. | 370/207 |
| 4,930,127 | 5/1990 | Abaziou et al. | 370/529 |
| 5,003,539 | 3/1991 | Takemoto et al. | 371/37.12 |
| 5,428,629 | 6/1995 | Gutman et al. | 371/37.7 |

FOREIGN PATENT DOCUMENTS

| | | |
|---|---|---|
| 0 300 606 A2 | 1/1989 | European Pat. Off. . |
| 0 600 380 A2 | 6/1994 | European Pat. Off. . |
| WO 83/02344 | 7/1983 | WIPO . |
| WO 87/06368 | 10/1987 | WIPO . |

OTHER PUBLICATIONS

S.A. Schmitt, "Inverted ECC to Flag Unreliable Data," IBM Technical Disclosure Bulletin, vol. 25, No. 3B, Aug. 1982, XP 000567980.

*Primary Examiner*—Paul P. Gordon
*Assistant Examiner*—Robert J. Dolan
*Attorney, Agent, or Firm*—Foley & Lardner

[57] ABSTRACT

In digital data packets comprising a first datum from which a second datum can be unequivocally computed, e.g. an error correction value, one or a plurality of additional data can be introduced by manipulating said second datum without altering the structure of the data packet. For this purpose, one or a plurality of bits of the second datum are modified in an unequivocally reversible manner, e.g. inverted, according to the additional datum which is also digital. The recuperation of the additional data is effected by comparing comparative values which are obtained by reversing all possible combinations of additional data in a received data packet to a value which is computed from the first datum of the data packet: The presence of the corresponding combination of additional data results from the consistency of the latter with one of said comparative values. Another possibility is to limit the inquiry to a fraction of the possible combination. A preferred application is the recognition of endlessly circulating ATM cells in a ring-shaped communication network. The one-bit additional datum is inserted in the HEC byte by a monitor node, and each ATM cell which reaches said monitor node and includes said additional datum is recognized as being undeliverable.

6 Claims, 4 Drawing Sheets

METHOD FOR THE INTEGRATION OF ADDITIONAL DATA IN DIGITAL DATA PACKETS

BACKGROUND OF THE INVENTION

The present invention refers to a method for the integration of at least one additional datum in a digital data packet which is capable of being represented as a sequence of bits and comprises a first datum as well as a second datum which is capable of being unequivocally computed from said first one.

It has been found that it is often necessary within ATM installations or more generally in telecommunication installations making use of digital data packets to incorporate additional information in ATM cells, i.e. in said data packets, without violating substantially or at all the conformity of said data packets to the applicable standard in order to be able to use the currently available apparatus. A method for the integration of such information, e.g a tag or one or a plurality of flags (independently variable information units which may assume more than two different states, i.e. which are represented by more than one bit), has not been known heretofore.

In the header of ATM (Asynchronous Transfer Mode) cells, besides an address field and control field comprising a total of four bytes (octets), a fifth byte is provided which serves as a HEC (header error correction) field in order to recognize errors in the header and to correct a certain number of them.

Further known are ring-shaped transmitting networks (loops), wherein a plurality of nodes are connected in a ring by a common transmission line having a uniform transmitting direction. It is further known in such loops to recognize the packets serving for the transmission of information, e.g. address-coded packets, which cannot be delivered and therefore circulate around the loop twice or more, by means of a marker which is added in the course of the first cycle, and to eliminate them. Said marker is constituted by a bit which is specially provided for this purpose, i.e. a so-called tag, and is inverted (luring the first cycle of the packet by a node serving this purpose. In the second cycle, said node will recognize the repeated arrival of the corresponding packet by the inverted bit.

In the standardized header of ATM cells, no place is provided for a marker bit (tag) of the described kind. The use of ATM cells in ring-shaped transmitting networks is therefore subject to a concomitant restriction since these transmitting networks may very quickly become completely congested unless the repeatedly circulating packets are eliminated.

SUMMARY OF THE INVENTION

It is an object of the present invention to provide a method for integrating data in digital data packets without altering the structure of the data packets or their useful content. This object is attained by a method wherein at least one or all of the bits of said data packet are manipulated in function of said additional datum in an unequivocally reversible manner by a manipulating unit in order to encode said additional datum in said data packet without altering its structure. Preferred embodiments and applications are defined in further claims.

Modern telecommunication networks use digital data packets for the transmission of data. Digital data packets are constituted of bits which are often comprised in bytes of 8 bits each, or else in words whose length is determined by the respective technique. Especially for the purpose of preventing transmission errors, the data packets mostly comprise redundant components such as an error check byte or word which is computed in a predetermined manner from another part of the data packet, e.g. by means of a check sum. Such redundancies may be introduced independently from each other at different levels of the transmission technique and serve to ensure the safety of the data packets. The safety procedures are generally a part of the applicable protocol of the data packets, such as the error check and correction byte (HEC byte) in the case of the data cells of the ATM standard.

It has now been found that at least within a partial telecommunication network, these redundant components can be used in order to introduce additional data into a data packet. For this purpose, one or a plurality of bits are inverted in the corresponding redundant part, the presence of the inversion corresponding to the value of a bit of the additional data in each case. According to the circumstances, one or a plurality of bits of the redundant part may be altered in order to represent one bit of the additional data.

Generally, however, any datum capable of assuming two or more discrete values can be expressed by a corresponding number of combined inversions, a certain combination of inversions which are applied each to one or a plurality of bits of the redundant part being associated to each value of the datum. The number of influenced bits may be different for the different combinations. An example of this would be a colour marking having the values red, green, or no colour, or analogously, a single-digit ternary number.

Foremost, this technique distinguishes itself by the fact that the number of bits, i.e. the length of the data packets, is unchanged. The data packets manipulated in this manner are thus basically capable of being transmitted through the same communication systems as the unmanipulated packets. Measures have to be taken only at those places where the redundant components are interpreted according to their original purpose as a normal interpretation will otherwise provide incorrect results.

These measures may comprise a modification of the corresponding electronics, e.g. simply a different evaluating module in a network node or, since evaluating procedures are concerned which today are often performed by a processor, may merely require the use of a different control program for the processor, e.g. by the exchange of a PROM or by loading it into a non-volatile memory.

The modification of the interpretation generally consists in individually reversing the manipulations resulting from all possible values of the additional data. Subsequently, the normal interpretation is applied to the redundant parts obtained in this manner. If one of these interpretations is free from errors, it can be assumed, in the first place, that the redundant part as well as the part of the data packet from which it is computed are known, and on the other hand, which ones of the different possible manipulations had to be reversed for this purpose, whence the corresponding additional datum is obtained.

Alternatively, the regularly interpreted redundant part can be manipulated according to all possible values of the additional data, and the different resulting possible manipulated redundant parts are compared to the redundant part as it appears in the data packet. In this case, the appearance of a consistency yields the two above-mentioned results.

Also, in some cases, the original function of the redundant part is no longer necessary. The above-mentioned interpretation may then be limited to that part of the possible values of the additional data which is required at a given point such as a particular node in the network.

Such redundant parts are e.g. a datum for error recognition or correction such as the HEC byte in ATM cells. In standard data packets, the prescriptions for the composition and the interpretation of said datum is a part of the protocol.

BRIEF DESCRIPTION OF THE DRAWINGS

The invention is further explained hereinafter by way of embodiments with reference to the drawings.

DETAILED DESCRIPTION OF THE INVENTION

Figure 1:
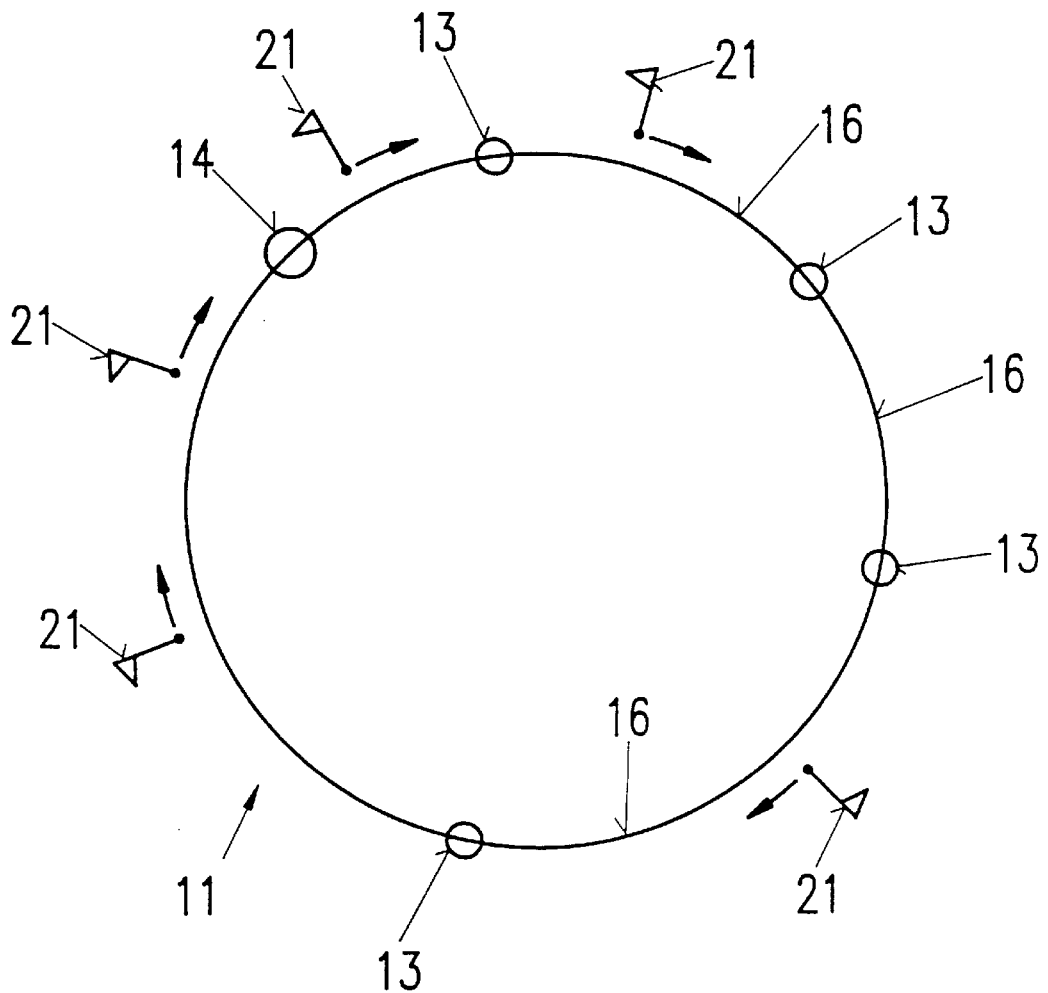
FIG. 1 shows the general structure of a ring-shaped transmission network.

FIG. 1 shows the known structure of a ring-shaped transmission network 11. This network comprises a plurality, e.g. four nodes 13 of a first, normal kind, and a monitor node 14. Nodes 13 and 14 are connected to each other in a ring-shaped manner by a transmission line 16, e.g. an optical fiber. ATM cells 21 run on transmission line 16 in a succession and in the same direction and are transmitted and received by nodes 13.

According to the actual standard, an ATM (Asynchronous Transfer Mode) cell 21 is formed of a continuous sequence of fifty-three bytes or octets comprising eight bits each. The first five bytes in the chronological succession form the header 22 of cell 21, while the remaining forty-eight bytes form the payload 23. Header 22 comprises 4 bytes of control information. The fifth byte of header 22 serves the purpose of monitoring possible errors of the header. This byte will be referred to as HEC (Header Error Control) byte 24 hereinafter. The bits of HEC byte 24 are formed on the basis of the four other bytes of header 22 by means of a standardized error correction code. The HEC byte is (preferably) checked by every one of nodes 13, 14 as long as ATM cell 21 circulates on transmission network 11. For this purpose, each node 13, 14 reads the five bytes of the header of each passing ATM cell 21 and computes an associated decision value. If the correct amount is obtained, it is assumed that header 22 is error-free.

If a deviation is obtained instead of the correct amount, individual incorrect bits can be determined and corrected by inversion. In this case, the entire ATM cell 21 is further considered as error-free. However, if an error with respect to two or more bits is detected in header 22, ATM cell will be considered as faulty and will be eliminated.

This known state of the art is now modified for the purpose of attaining the mentioned object of the invention as follows: as described, each ATM cell 21 circulates on transmission network 11 until it eventually passes monitor node 14 for the first time. When this is the case, said node 14 marks ATM cell 21 by inverting e.g. the last bit of HEC byte 24. A one-bit error is thus consciously produced in header 22.

Now, in order to compensate the introduced one-bit error, every normal node 13 generally checks the consistency of header 22 with HEC byte 24 twice. For this purpose, it will assume, in the first place, that the mentioned last bit of HEC byte 24 has not yet been inverted (since the ATM cell has not yet passed monitor node 14). Secondly, normal node 13 assumes that the mentioned last bit of HEC bytes 24 is inverted (since the ATM cell has already passed monitor node 14). If there is no error in header 22, one or the other of said checks will indicate that there is no error, and the concerned node 13 transmits the corresponding ATM cell 21 unaltered.

Even if no one of the two checks yields a correct result, i.e. "no error", it is still possible to determine the version which is more probably correct, i.e. whose error significance is lowest. The number of incorrect bits may, e.g. serve as a measure for said error significance. If an error check or correction is completely omitted, that version which is most probably correct can always be supposed to be correct. Also, an upper limit of error significance may be determined above which an interpretation is no longer possible.

However, as previously described, node 13 is also capable of recognizing and correcting accidental one-bit errors. Furthermore, it will recognize multiple bit errors and is thus capable of eliminating faulty ATM cells 21. The function of nodes 13 is therefore hardly impaired by said marking, i.e. by the inversion of the last bit of HEC byte 24. They only need to perform a double check, which can be realized without substantially increased time or other requirements.

Besides the described marking of all passing ATM cells 21, monitor node 14 checks whether the concerned ATM cell 21 is arriving repeatedly. For this purpose, in contrast to the normal nodes 13, it (14) assumes that the mentioned last bit has not yet been inverted and computes the associated decision value. If this indicates correctness, the concerned ATM cell 21 is considered to have arrived at monitor node 14 for the first time. However, if the decision value indicates an error in the mentioned last bit, the concerned ATM cell 21 is considered to have arrived again at monitor node 14 and must therefore be eliminated. If no one of the two decision values indicates correctness, it is still possible to consider that version as correct whose error significance as indicated by the decision value is lower. The necessary recognition of ATM cells which circulate on the ring-shaped transmission network twice or multiple times thus constitutes no substantial additional requirements with respect to monitor node 14 either.

Instead of the mentioned last bit of HEC byte 24, any other bit of this HEC byte may individually be inverted for the purpose of marking the ATM cells. The same effect is obtained in every case. Likewise, two or more bits of HEC byte 24 may be used as well. It is possible, in particular, to invert all eight bits of HEC byte 24.

As shown, the method is simple and inexpensive. Therefore, it allows the use of ATM cells 21 for the transmission on transmission loops 11 in an elegant manner. On account of the quasi-compliance with the ATM standard, such transmission loops may easily be combined with other ATM installations such as other loops and/or star-shaped networks.

A further developed method also allows to incorporate data such as markings (tags) or smaller information units (flags) in said HEC byte and to transmit them, e.g. in order to indicate priorities, to mark ATM cells, to support synchronization procedures, to transmit reception confirmations, etc. In this general application of the method of the invention, the term "tag" shall stand for a marking, i.e. a datum which is capable of assuming only two values equivalent to the information of one bit. On the other hand, the term "flag" shall designate a datum having more than two possible values, more particularly according to the values which are represented by a certain number of bits, e.g. 4 values or states as represented by 2 bits.

Figure 2:
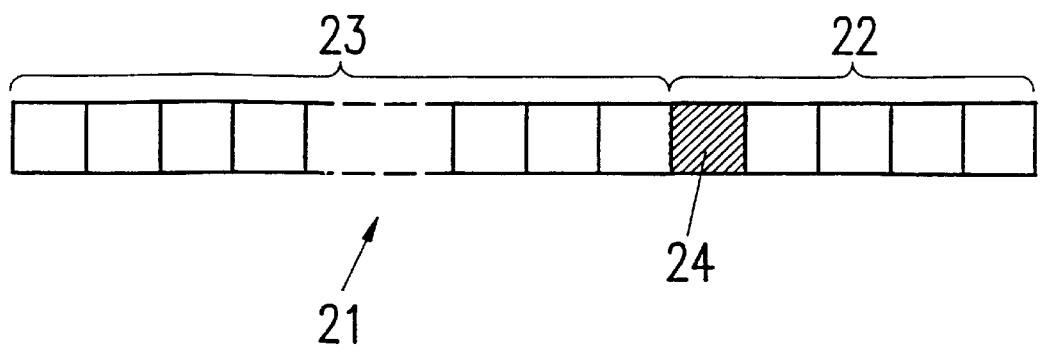
FIG. 2 shows the structure of an ATM cell.
Figure 3:
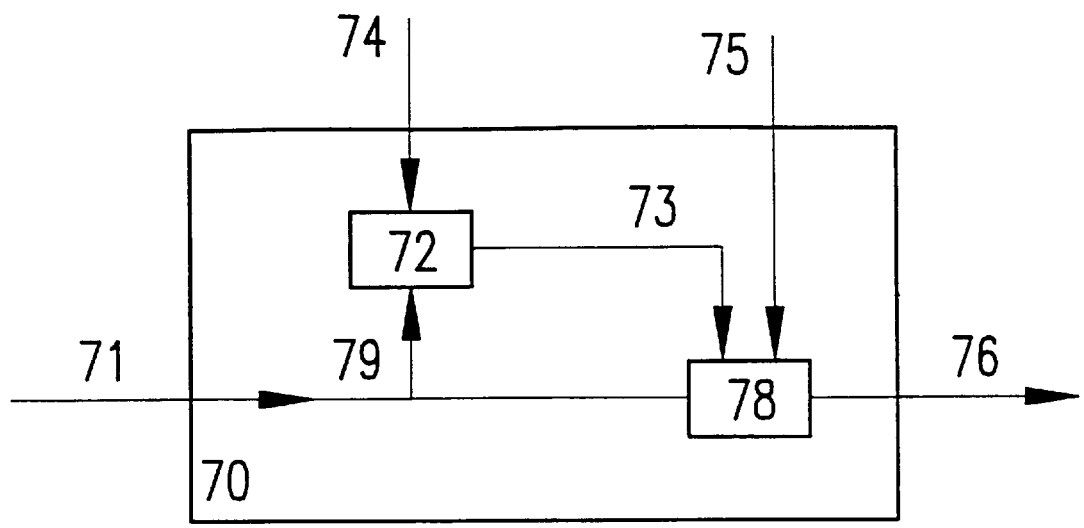
FIG. 3 schematically shows a tag encoder unit.

An encoder 70 for the introduction of a tag or a flag is shown in FIG. 3. At its input 71, encoder 70 receives an ATM cell 21 (see FIG. 2) whose HEC byte 24 has already been computed. Cell 21 is transmitted to interpreter 72 and to tag or flag inverter 78. On the basis of the content of ATM cell 21 and/or of the an external signal supplied to control input 74, interpreter 72 decides whether a tag or a flag of a determined value must be introduced in the ATM cell, and controls inverter 78 by control line 73. The information as to which bits of the HEC byte have to be manipulated is either permanently built in or supplied to inverter 78 by an additional input 75. The encoder for the introduction of a flag and that for the introduction of a tag are thus essentially identical in structure while only interpreter 72 and inverter 78 must be adapted to the conditions of setting a one-bit value (tag) or a multiple bit value (flag). The specific embodiment is easily accessible to those skilled in the art on the basis of the present system description, however.

Figure 4:
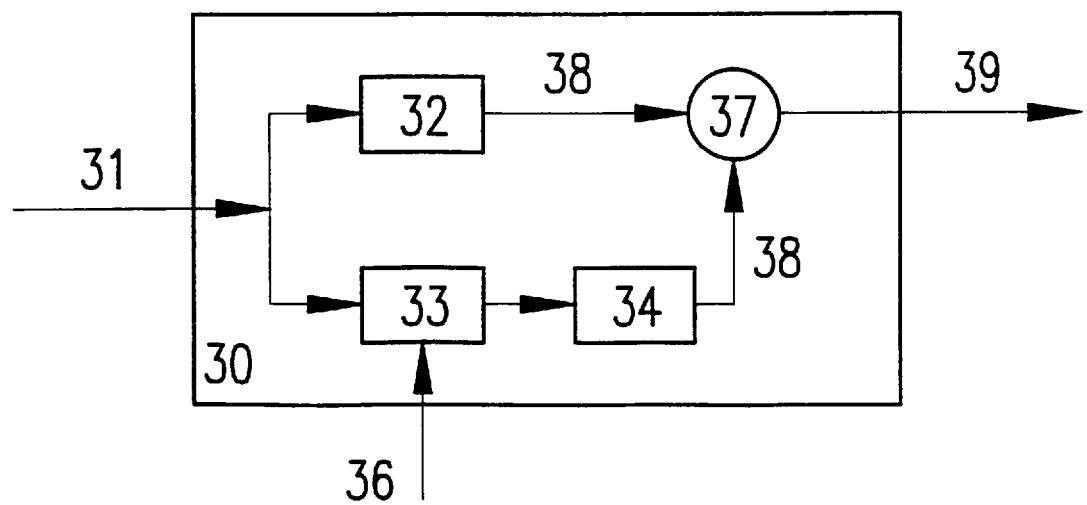
FIG. 4 schematically shows a tag decoder unit.

FIG. 4 shows a tag decoder 30 whose function is to find out whether an ATM cell received at input 31 has been tagged or not. For this purpose, the ATM cell undergoes a double processing, one of said processing steps assuming the presence of a tag. For this purpose, the ATM cell is supplied to a tag remover 33. Tag remover 33 inverts the bits of the HEC byte which would have been inverted in the process of tagging. The information as to which bit or bits are concerned may either be permanently determined in tag remover 33 or supplied to tag remover 33 by an external input 36.

The processed ATM cell is then supplied to a HEC byte interpreter, as well as the unprocessed ATM cell is directly supplied from input 31 to an identical comparative HEC byte interpreter 32. A tag interpreter 37 receives the results of both HEC interpreters 32 and 34. If one of the two results is correct, the ATM cell can be considered error-free at this point. If the result of HEC interpreter 34 is correct as well, the ATM cell is tagged. Correspondingly, the ATM cell is untagged if the result of tag interpreter 32 is correct. If both HEC interpreters 32, 34 supply a correct or an incorrect result, there is an error condition, and tag interpreter 37 may proceed to the elimination of the ATM cell or correct the existing error by means of an error correction algorithm and determine subsequently whether a tag had been present or not. The information of the tag interpreter as to whether the ATM cell is error-free, tagged, and/or has possibly been corrected is available at output 39.

Figure 5:
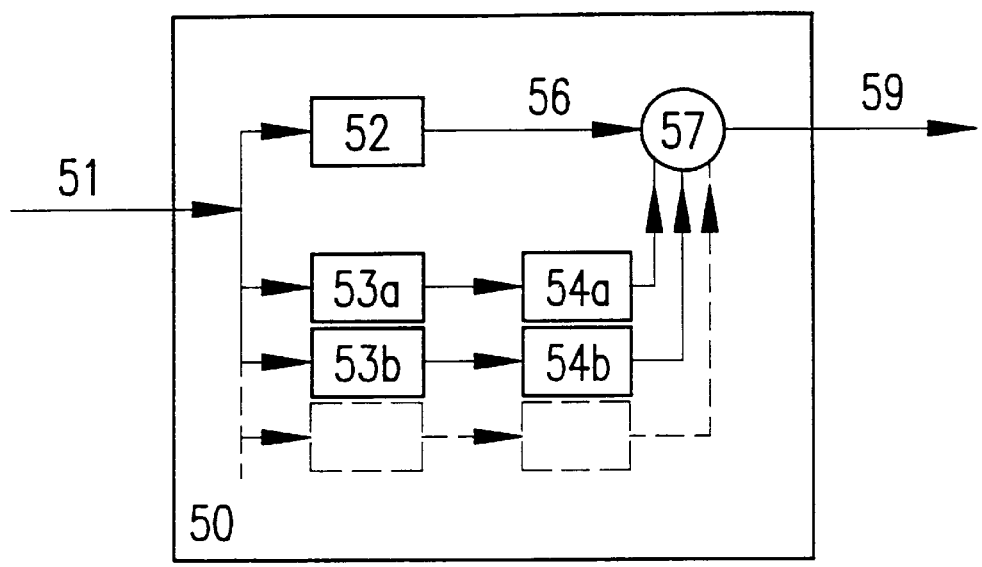
FIG. 5 schematically shows a flag decoder unit.

FIG. 5 shows the basic structure of a flag decoder 50. In analogy to tag decoder 30, it is formed of flag removers 53 having each a following HEC interpreter 54, of a comparative HEC interpreter 52 which receives the ATM cells entering at input 51 directly, and of a flag interpreter 57 which compares the results of HEC interpreter 52 to those of the different flag remover strings (i.e., a respective flag remover 53x with a following HEC interpreter 54x) and determines which flags of which respective value are set in the ATM cell and whether the ATM cell is error-free. This information is available at output 59.

Since more than one flag can be set in an ATM cell and each flag may represent a plurality of values, a flag decoder needs to reverse any combination of every possible value of each flag in an associated flag remover string before performing the HEC interpretation. If the latter provides the correct value, the concerned ATM cell had contained the combination of flags and flag values undone in that string. In FIG. 5, two such strings are explicitly indicated, namely a first string a comprising remover 53a and HEC interpreter 54a, and a second string b comprising tag remover 53b and HEC interpreter 54b.

Figure 6:
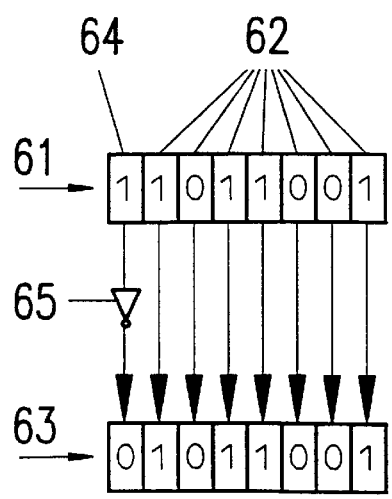
FIGS. 6 to 8 show three possibilities for incorporating a tag in an exemplary 8 bit error recognition sequence.
Figure 7:
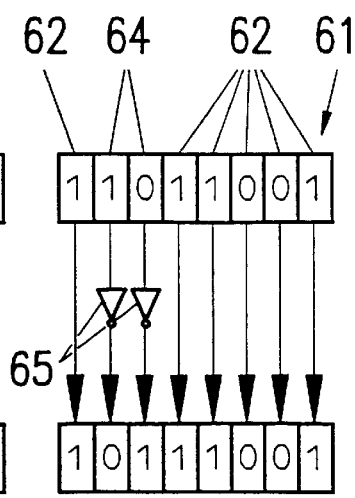
Figure 8:
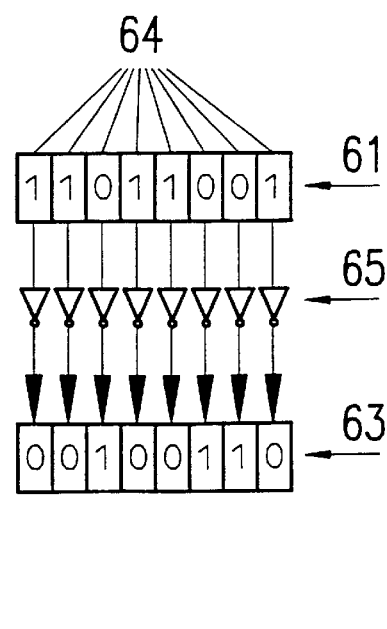

FIGS. 6 to 8 show three different ways of introducing a tag into the HEC byte and of removing the concerned tag. Since the tag is set by inversion of one or a plurality of bits of the HEC byte, the tag can also be removed by repeating this procedure. According to FIG. 6, one bit is manipulated, i.e. the seven bits 62 of the input HEC byte are incorporated in the output HEC byte 63 unaltered while tag bit 64 is first inverted by inverter 65.

FIGS. 7 and 8 show further possibilities of introducing a tag, while those elements which correspond to FIG. 6 are designated by the same reference numerals and need not be further explained. The alternative according to FIG. 7 employs two bits 64 which are inverted at the same time in order to signal the presence of a tag in the output HEC byte 63. In FIG. 8, finally, the entire input HEC byte is inverted. It is understood that the inversion is omitted if it is not intended to set a tag, i.e. the input HEC byte 61 is left unaltered. This may e.g. be obtained by the use of controllable inverters 65 or by providing a selection between a path for bits which are intended to be tagged by tag encoder 78 and another one for those which are not.

Figure 9:
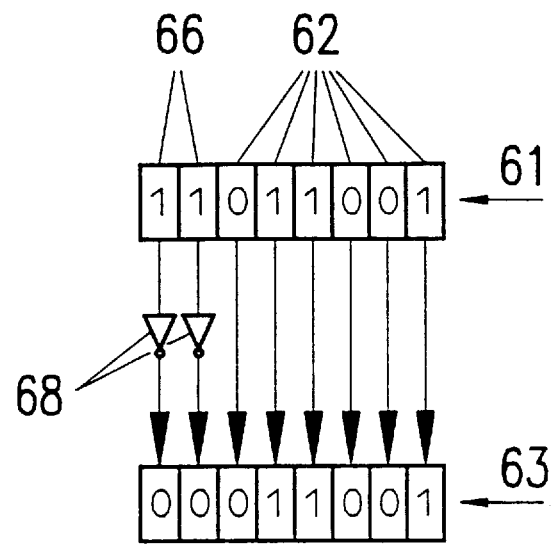
FIGS. 9, 10 show the insertion of flags in an exemplary 8 bit error recognition sequence.
Figure 10:
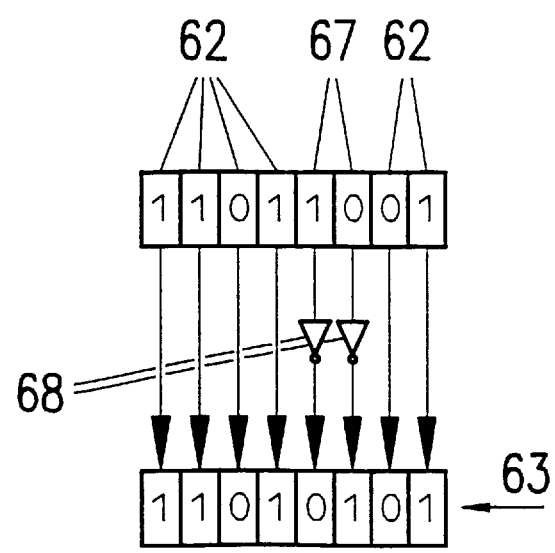

FIGS. 9 and 10 show the principle of introducing a respective flag into an input HEC byte 61. Again, the elements corresponding to previously discussed FIGS. 6 to 8 are designated by the same reference numerals and need not be further discussed. In FIG. 9, the first two bits 66 of input HEC byte 61 are inverted according to the value of the desired flag, i.e., if the flag has the value 0, no one of bits 66 is inverted at all, and if the desired value of the flag is 1 to 3, one or both bits 66 are inverted according to the binary representation of the flag value. FIG. 10 shows the same situation with the use of two different bits 67 of the input HEC byte.

Preferably, in the case of a flag having three values (red/green/no color), however, only bits 66 (FIG. 9) are inverted for one value (red) and only bits 67 (FIG. 10) for the other value (green), and no inversion is effected otherwise. This selective inversion of bits 66 and 67 is preferably ensured by controllable inverters 68. The control lines and the corresponding logic control system are not shown since current components and controls may be used for this purpose.

The introduction of flags or tags according to FIGS. 6, 7, 9 and 10 into the same ATM cell may be effected mutually independently in parallel or successively if different bits 54, 66, 67 are used for the respective manipulation. In the area of the network wherein the respective flags or tags can be present, however, the decoders must be prepared for every combination of tags and/or flags. Otherwise, an HEC byte interpreter unit which is not prepared for a given flag or tag will consider an ATM cell having a modified HEC byte as faulty and take the corresponding action.

Further developments and modifications of the described example, and in particular its application to data packets other than ATM cells are apparent to those skilled in the art without leaving the scope of the invention.

It is basically conceivable to perform such an incomplete decoding of the manipulated datum, e.g. of the HEC byte, if the resulting limitation of its originally intended function is acceptable.

In the case of combinations of inversions which influence several bits of the manipulated datum at the same time, instead of the two possibilities (all concerned bits are inverted/none of the bits is inverted), another method can be adopted, e.g. a push-pull inversion with 2 bits. Generally speaking, any pattern of inversions can be associated to each state.

The described functions can be performed by dedicated circuits, by a processor under control of a program, or by a combination of both.

We claim:

1. A method of integrating additional data in a digital data packet, said packet is capable of being represented by a sequence of bits and comprises a first datum as well as a second datum which is unequivocally computed from said first datum, wherein at least one bit of said digital data packet is manipulated as a function of said additional data in an unequivocally reversible manner in order to encode said additional data in said data packet without altering a structure of said data racket; and obtaining said additional data from said digital data packet, wherein:

first provisional data are derived from said second datum by reversing, in a remover, the corresponding manipulation for at least one additional value of at least one additional datum of said second datum;

an error check procedure is applied by an interpreter to said first provisional data and to the unaltered data packet, the result of said procedure being an indication of probability at least with respect to whether said first datum corresponds to its original value;

the highest value of probability is determined by a second interpreter; and the combination of additional data yielding the highest value of probability is output by the interpreter.

2. The method of claim 1, wherein said values of probability are determined with all possible combinations of the values of all additional data which are permissible in said second datum.

3. The method of claim 1, wherein a faulty first and/or second datum is assumed if no value of probability attaining the limit of sure consistency, or several ones, are obtained.

4. A method of integrating additional data in a digital data packet, said packet is capable of being represented by a sequence of bits and comprises a first datum as well as a second datum which is unequivocally computed from said first datum, wherein at least one bit of said digital data packet is manipulated as a function of said additional data in an unequivocally reversible manner in order to encode said additional data in said data packet without altering a structure of said data packet; and obtaining said additional data from said digital data packet, wherein an interpreter derives second comparative data from said first datum by applying the method for computing the second datum, said second comparative data is manipulated according to the value of at least one additional datum in order to obtain third comparative data, a respective value of probability is computed at least with respect to whether said third comparative data correspond to said second datum which is present in the data packet, and those values of the additional datum which yield the highest value of probability are output.

5. A method of integrating additional data in a digital data packet, said packet is capable of being represented by a sequence of bits and comprises a first datum as well as a second datum which is unequivocally computed from said first datum, wherein at least one bit of said digital data packet is manipulated as a function of said additional data in an unequivocally reversible manner in order to encode said additional data in said data packet without altering a structure of said data packet; and applying said method for the recognition of faulty and/or multiply circulating data packets in a ring-shaped communication network, said communication network comprising a plurality of nodes which are serially connected by a transmission line having a unique transmitting direction and one of which serves as a monitor node;

an error correction byte being provided in a header portion of said data packets for the purpose of recognizing transmission errors, and each node computing, from the bits of said header portion of a given data packet, a decision value which indicates whether an error is present in said header portion or not;

a monitor node being provided for the purpose of recognizing multiply circulating data packets, which marks each transiting data packet in a recognizable manner, and monitors whether the concerned data packet is already marked, and said error correction byte of the data packet representing said second datum and that part of said header portion which is protected by said error correction byte representing said first datum, wherein said monitor node inverts at least one of the bits of said error correction byte in order to mark the transiting data packets, for the purpose of recognizing transmission errors in the header of the data packets, each one of said nodes additionally inverts those bits of the header of the respective data packet which are also inverted in said monitor node, a second decision value is computed from the total of bits resulting therefrom, and the combination of said first and said second decision value indicates whether an error is present in said header, and for the purpose of recognizing multiply circulating data packets, said monitor node computes a decision value from the bits of said header of the concerned data packet which indicates whether those bits which are inverted for marking purpose are being inverted or not.

6. Application of the method of claim 5, wherein said data packets are ATM cells.

* * * * *